(12) United States Patent  
Xue et al.

(10) Patent No.: US 12,536,818 B2
(45) Date of Patent: Jan. 27, 2026

(54) LICENSE PLATE CLASSIFICATION METHOD, LICENSE PLATE CLASSIFICATION APPARATUS, AND COMPUTER-READABLE STORAGE MEDIUM

(71) Applicant: ZHEJIANG DAHUA TECHNOLOGY CO., LTD., Hangzhou (CN)

(72) Inventors: Jiale Xue, Hangzhou (CN); Jingyu Dun, Hangzhou (CN); Yayun Wang, Hangzhou (CN); Wanwan Zhang, Hangzhou (CN); Yikun Li, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 267 days.

(21) Appl. No.: 18/388,938

(22) Filed: Nov. 13, 2023

(65) Prior Publication Data

US 2024/0087343 A1 Mar. 14, 2024

Related U.S. Application Data

(63) Continuation of application No. PCT/CN2021/118340, filed on Sep. 14, 2021.

(30) Foreign Application Priority Data

May 11, 2021 (CN) .......................... 202110513559.4

(51) Int. Cl.
G06V 20/62 (2022.01)
G06V 10/764 (2022.01)
(Continued)

(52) U.S. Cl.
CPC .......... *G06V 20/625* (2022.01); *G06V 10/764* (2022.01); *G06V 10/806* (2022.01); *G06V 10/82* (2022.01)

(58) Field of Classification Search
CPC .... G06V 20/625; G06V 10/806; G06V 10/82; G06V 10/764
See application file for complete search history.

(56) References Cited

U.S. PATENT DOCUMENTS

| 10,963,719 B1 | 3/2021 | Hantehzadeh et al. |
| 10,963,722 B2 | 3/2021 | Snell |
| 2013/0182910 A1 | 7/2013 | Burry et al. |

FOREIGN PATENT DOCUMENTS

| CN | 110020669 A | 7/2019 |
| CN | 111222513 A | 6/2020 |

(Continued)

OTHER PUBLICATIONS

Molder et al., "Decision Fusion for Improved Automatic License Plate Recognition", 2009, WSEAS Transactions on Information Science and Applications, Issue 2, vol. 6, pp. 291-300 (Year: 2009).*

(Continued)

*Primary Examiner* — David F Dunphy

(57) ABSTRACT

A license plate classification method, a license plate classification apparatus and a computer-readable storage medium are provided. The method includes: performing a license plate recognition process on a first license plate image to obtain a license plate recognition result; performing an encoding process on the license plate recognition result to obtain a first license plate feature; performing a feature extraction process on the first license plate image to obtain a second license plate feature; and processing the first license plate feature and the second license plate feature (Continued)

through a classification network to obtain a first license plate classification result. In this way, an accuracy of license plate classification is improved.

20 Claims, 5 Drawing Sheets

(51) Int. Cl.
  *G06V 10/80* (2022.01)
  *G06V 10/82* (2022.01)

(56) References Cited

FOREIGN PATENT DOCUMENTS

| CN | 112257764 A | 1/2021 |
|---|---|---|
| CN | 112381129 A | 2/2021 |
| CN | 113408574 A | 9/2021 |

OTHER PUBLICATIONS

De Oliveira et al, "Vehicle-Rear: A New Dataset to Explore Feature Fusion for Vehicle Identification Using Convolutional Neural Networks", Jul. 19, 2021, Digital Object Identifier 10.1109/ACCESS. 2021.3097964, vol. 9, pp. 101065-101077 (Year: 2021).*

Zhang Linjiang et al:"A Robust Attentional Framework for License PlateRecognition in the wild" , IEEE Transactions on Intelligent Transportation Systems , IEEE, Piscataway, NJ, USA, vol. 22, No. 11, Jun. 18, 2020 (Jun. 18, 2020), pp. 6967-6976, XP011886569, ISSN: 1524-9050, DOI: 10.1109/TITS.2020.3000072 [retrieved on Nov. 1, 2021] sectiond IV.B and VII; figure 2.

Dorbe Nauris et al: "FCN and LSTM Based Computer vision System for Recognition of vehicle Type, License Plate Number, and Registration Country" , Automatic Control and Computer Sciences , Allerton Press, Inc. New York, US, vol. 52, No. 2, May 21, 2018 (May 21, 2018), pp. 146-154, XP036509863, ISSN: 0146-4116, DOI: 10.3103/S0146411618020104 [retrieved on May 21, 2018] the whole document.

Weihong Wang et al:"Research on License Plate Recognition Algorithms Based on Deep Learning in complex Environment", IEEE Access, IEEE, USA, vol. 8,May 14, 2020 (May 14, 2020), pp. 91661-91675, XP011790110, DOI: 10.1109/ACCESS. 2020. 2994287 [retrieved on May 22, 2020] section rv.B.

Gao Jing et al: "A Survey on Deep Learning for Multimodal Data Fusion", Neural Computation. , [online] vol. 32, No. 5,May 1, 2020 (May 1, 2020) , pp. 829-864, XP093187696, US ISSN: 0899-7667, DOI: 10.1162 /neco_a_01273 Retrieved from the Internet : URL: http://direct.mit.edu/neco/article-pdf/32/5/829/1865303/neco_a_01273.pdf> [retrieved on Jul. 19, 2024] section 3.1.1.

European Search Report,European Application No. 21941594.0, mailed Aug. 9, 2024 (35 pages).

AiBianChengZhenShiTaiHaoLc Detailed explanation of Transformer model CSDN ; Jan. 11, 2019(Jan. 11, 2019) paragraphs 1-2.

Chinese First Office Action, Chinese Application No. 2021105135594, mailed Jan. 5, 2022 (14 pages).

Notification to Grant Patent Right for Invention, Chinese Application No. 2021105135594, mailed Mar. 29, 2022 (5 pages).

International Search Report,International Application No. PCT/CN2021/118340, mailed Feb. 10, 2022 (10 pages).

* cited by examiner

LICENSE PLATE CLASSIFICATION METHOD, LICENSE PLATE CLASSIFICATION APPARATUS, AND COMPUTER-READABLE STORAGE MEDIUM

CROSS REFERENCE TO RELATED APPLICATIONS

The present is a continuation application of the international patent application No. PCT/CN2021/118340, filed on Sep. 14, 2021, which claims the priority of Chinese patent application No. 202110513559.4, filed on May 11, 2021, and contents of which are incorporated herein by its entireties.

TECHNICAL FIELD

The present disclosure relates to the field of image processing technology, and in particular to a license plate classification method, a license plate classification apparatus, and a computer-readable non-transitory storage medium.

BACKGROUND

An oversea license plate classification technology refers to inputting a license plate and outputting a nation, which the plate belongs to. In the art, the license plate classification technology is mainly divided into two categories: classification based on a traditional image processing method and classification based on deep learning. Compared to the traditional image processing method, the license plate classification method based on deep learning is more accurate and is applicable to classify various types of license plates, which has a wider range of applications. However, as a task of classifying oversea license plates by nations requires acquiring license plate data of each nation, it may be difficult to collect complete data, which has higher requirements for the generalization ability of the classification mode. In addition, license plates of some nations (especially nations that are geographically close to each other) may be highly similar and may be difficult to be distinguished. Some nations have a large number of types of license plates, and that is, "limited variations between classes and great variations within classes", resulting in low classification accuracy.

SUMMARY OF THE DISCLOSURE

The present disclosure provides a license plate classification method, a license plate classification apparatus, and a computer-readable non-transitory storage medium, which may improve the accuracy of license plate classification.

According to a first aspect, a license plate classification method is provided and includes: performing a license plate recognition process on a first license plate image to obtain a license plate recognition result; performing an encoding process on the license plate recognition result to obtain a first license plate feature; performing a feature extraction process on the first license plate image to obtain a second license plate feature; and processing the first license plate feature and the second license plate feature through a classification network to obtain a first license plate classification result.

According to a second aspect, a license plate classification apparatus is provided and includes a non-transitory memory and a processor connected to the non-transitory memory. The non-transitory memory is configured to store a computer program, and the computer program is configured to perform the license plate classification method in the above when being executed by the processor.

According to a third aspect, a computer-readable non-transitory storage medium is provided and is configured to store a computer program. The computer program is configured to perform the license plate classification method in the above when being executed.

According to the present disclosure, a first license plate image is obtained, and a license plate recognition process is performed on the first license plate image, generating a license plate recognition result. The license plate recognition result is encoded to generate a first license plate feature. At the same time, an appearance feature of the first license plate image is extracted to generate a second license plate feature. The first license plate feature and the second license plate feature are processed through a classification network to obtain a license plate classification result. According to the present disclosure, the classification network can learn both an appearance pattern of the license plate and an inner format of the license plate. By recognizing the license plate, each character of the license plate is obtained, and an inner rule of license plate characters is extracted. The license plate characters may be transformed into useful features for classification by nations. In this way, a difficulty of a license plate nation classification network to learn license plate content may be reduced, and an accuracy of classifying the license plates by nations may be improved. In addition, the rules of the format of the license plate characters are integrated into the classification network, instead of being isolated and classified at first and being corrected subsequently. The method may facilitate correctly distinguishing vehicles plates having complicated rules and patterns.

BRIEF DESCRIPTION OF THE DRAWINGS

In order to more clearly describe the technical solutions in the embodiments of the present disclosure, the following will briefly introduce the drawings required in the description of the embodiments. Obviously, the drawings in the following description are only some embodiments of the present disclosure. For those skilled in the art, other drawings can be obtained based on these drawings without creative work.

FIG. 1(*b*) is a schematic view of a license plate from a nation B.

FIG. 1(*c*) is a schematic view of a license plate from a nation C.

DETAILED DESCRIPTION

Figure 1A:
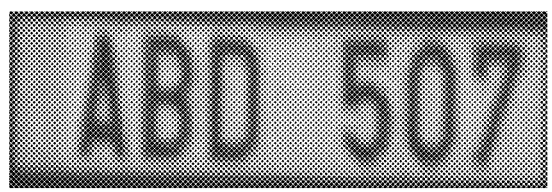
FIG. 1(*a*) is a schematic view of a license plate from a nation A.

The technical solutions in the embodiments of the present disclosure will be clearly and comprehensively described in the following by referring to the accompanying drawings in the embodiments of the present disclosure. Obviously, the described embodiments are only a part of, but not all of, the embodiments of the present disclosure. Based on the embodiments in the present disclosure, all other embodiments obtained by a person of ordinary skill in the art without making creative work shall fall within the scope of the present disclosure.

In order to illustrate the principle and motivation of the technical solution provided in the present disclosure, some examples are illustrated. FIGS. 1(*a*)-1(*c*) show license plates which come from three different nations and are highly similar to each other. FIG. 1(*a*) shows the license plate from a nation A, FIG. 1(*b*) shows the license plate from a nation B, and FIG. 1(*c*) shows the license plate from a nation C. An appearance of the license plate from the nation A is extremely similar to an appearance of the license plate from the nation B. An ordinary classification method cannot classify the plates from the nation A and the nation B accurately. However, arrangement orders of alphabets and digits of the two license plates are different in some extent. An appearance of the license plate from the nation C is more different from the appearance of the license plate from the nation A, compared to the appearance of the license plate from the nation B. However, an arrangement order of alphabets and digits on the plate from the nation C is the same as the arrangement order of alphabets and digits on the plate from the nation A. In order to accurately distinguish the license plates of these three nations, it is necessary to combine the appearance of the license plate and an inner format of the license plate characters. However, for a task of classifying oversea license plates, which may be in dozens or even hundreds of types, by nations, the license plate formats in some nations may be complicated, it is difficult to conclude the rule of the plates only through human efforts. Therefore, a qualified oversea license plate classification network needs to learn not only an overall appearance of the license plate but also content of the license plate and an arrangement rule of the license plate. In practical applications, due to a limited amount of data and the high difficulty of the task, it may be difficult for a general classification network to take into account various key features. A general classification network with Convolutional Neural Networks (CNN) is often better at learning only the overall appearance of license plate, and it is almost impossible for the CNN to learn the content of the license plate.

To solve the above problem, the present disclosure provides a method of classifying license plates by nations based on feature fusion of CNN and Transformer. The method uses a two-branch network: a Transformer branch and a CNN branch. The Transformer branch is configured to extract intrinsic connection between characters on the license plate. The CNN branch is configured to extract a key feature of the appearance of the license plate. By fusing the features of the above two aspects, a more robust feature is composed and then sent into the classification network to obtain a more accurate classification result. Technical solutions of the present disclosure will be illustrated in more details.

Figure 2:
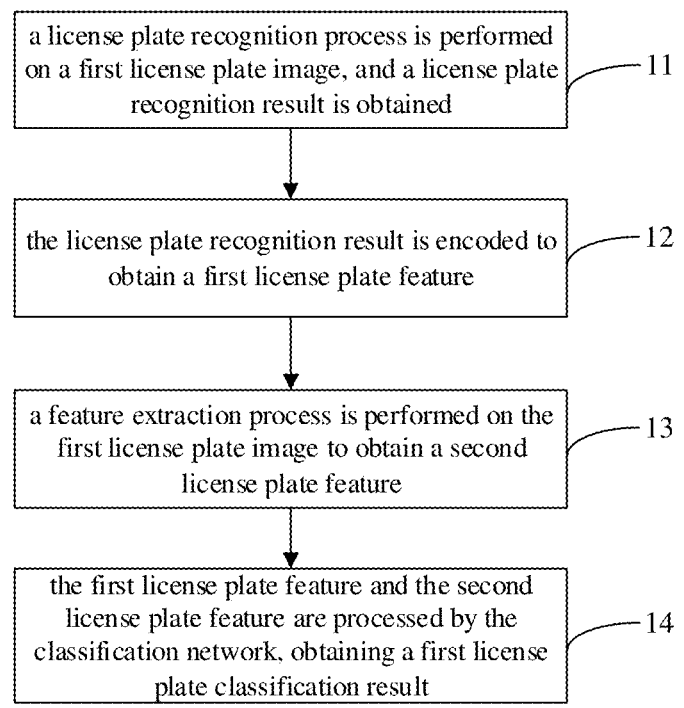
FIG. 2 is a flow chart of a license plate classification method according to an embodiment of the present disclosure.

As shown in FIG. 2, FIG. 2 is a flow chart of a license plate classification method according to an embodiment of the present disclosure. The method includes following operations.

In an operation 11, a license plate recognition process is performed on a first license plate image to obtain a license plate recognition result.

The first license plate image may be obtained by an image acquisition device or by searching from an image database. The image acquisition device may be a camera or an apparatus having a camera. The image acquisition device may be arranged on a vehicle or may be independent of the vehicle.

After obtaining the first license plate image, a license plate recognition algorithm in the art may be applied to perform the license plate recognition process on the first license plate image to generate the license plate recognition result. For example, taking FIG. 1(*a*) as an example, the license plate from the nation A may be recognized, and the obtained license plate recognition result is {A, B, D, 5, 0, 7}.

Further, an acquired scene image (including the license plate) may be directly taken as the first license plate image. Alternatively, an image of an area where the license plate is located in the scene image may be taken as the first license plate image. When taking the image of the area where the license plate is located in the scene image as the first license plate image, the subsequent process performed on the first license plate image may be simpler and more effective.

In an operation 12, the license plate recognition result is encoded to obtain a first license plate feature.

After obtaining the license plate recognition result corresponding to the first license plate image, an encoding mode may be performed to encode the license plate recognition result to obtain a corresponding encoded feature (i.e., the first license plate feature).

In an operation 13, a feature extraction process is performed on the first license plate image to obtain a second license plate feature.

For the acquired first license plate image, a feature extraction mode (e.g., CNN) may be applied to perform the feature extraction process directly on the first license plate image to generate a corresponding feature (i.e., the second license plate feature).

In an operation 14, the first license plate feature and the second license plate feature are processed by the classification network to obtain a first license plate classification result.

After obtaining the first license plate feature and the second license plate feature, the first license plate feature and the second license plate feature may be input into a pre-trained classification network. The classification network may fuse or classify the first license plate feature and the second license plate feature to obtain the first license plate classification result. For example, taking FIG. 1(*a*) as an example, after performing the operations of 11-14 on the image shown in FIG. 1(*a*), the first license plate classification result, which indicates the nation of the license plate being the nation A, is obtained.

According to the present disclosure, the license plate recognition process is performed on the obtained first license plate image directly to obtain character content of the license plate. The character content is encoded to obtain a corresponding text feature. An appearance feature, which is obtained by performing the feature extraction process on the first license plate image, and the text feature are fused and classified. In this way, the license plate classification result is obtained. Since the rule of the character format of the license plate is integrated into the classification network, instead of being isolated and classified at first and being corrected subsequently, the license plates having complicated rules and patterns may be distinguished easily. In addition, by improving the input of the classification network, a difficulty of the classification network, which classifies the license plate by nations, to learn the content of the license plate is reduced, a better classification effect is obtained, and the accuracy of license plate classification is improved.

Figure 3:
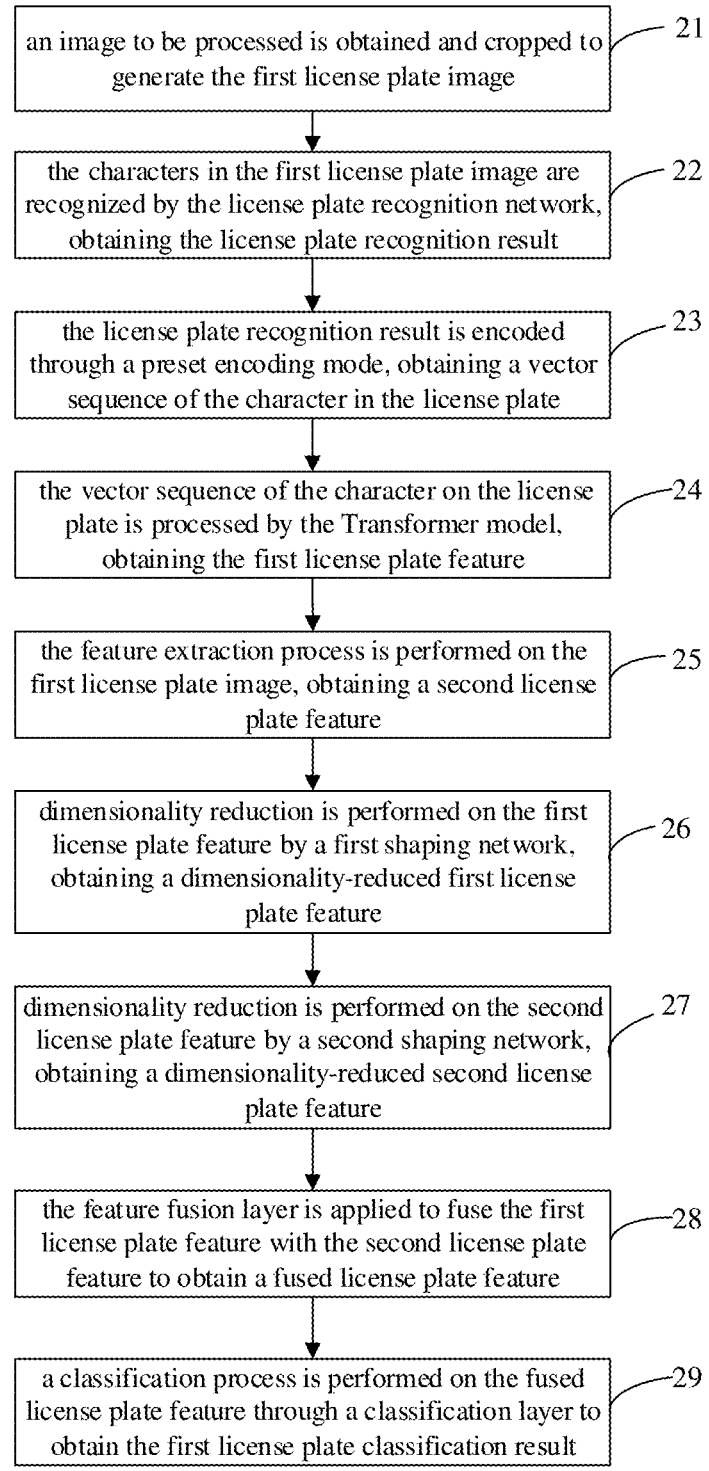
FIG. 3 is a flow chart of a license plate classification method according to another embodiment of the present disclosure.

As shown in FIG. 3, FIG. 3 is a flow chart of a license plate classification method according to another embodiment of the present disclosure. The method includes following operations.

In an operation 21, an image to be processed is obtained and cropped to generate the first license plate image.

The image to be processed is obtained by the image acquisition device. A location of the license plate in the image to be processed is obtained by a license plate detection model. An image of the location of the license plate in the image to be processed is cropped to obtain the first license plate image. The first license plate image includes the license plate.

In an operation 22, the characters in the first license plate image are recognized by the license plate recognition network to obtain the license plate recognition result.

Figure 4:
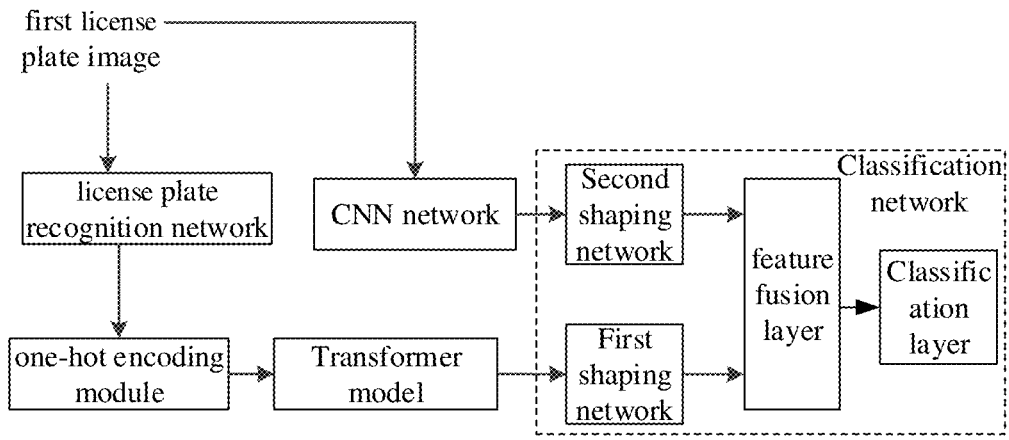
FIG. 4 is a structural schematic view of license plate classification according to an embodiment of the present disclosure.

As shown in FIG. 4, the first license plate image is input to the license plate recognition network. The license plate recognition network recognizes the characters (including digits, English letters or other special characters) in the first license plate image to generate the license plate recognition result.

In an operation 23, the license plate recognition result is encoded by performing a preset encoding mode to obtain a vector sequence of the license plate characters.

The characters in the oversea license plate usually include digits, English letters, local characters or special symbols. In order to convert the characters in license plates into valid inputs for the Transformer model, in the present embodiment, a one-hot encoding module is applied to perform one-hot encoding on the license plate recognition result. That is, the preset encoding mode is the one-hot encoding. In this way, a string of characters in the license plate recognition result is converted into a vector that uniquely corresponds thereto. An encoding rule is described in the following.

For example, when the number of types of characters in an oversea license plate is M, a maximum possible length of the characters in the license plate is N, and a length of the characters in the plate to be classified is S, a vector of length M is assigned to each character in the license plate. Since the length of the vector is the same as the number of types of the characters, each position in the vector is associated with one character. For a certain character, a value of a corresponding position in the vector is set to be 1, and a value of each remaining position is set to be 0, such that a unique vector is generated to represent the certain character. For a license plate having S characters, S vectors are generated, each of the S vectors has a length M. Further, supplementation is performed to generate (N−S) vectors. In each of the (N−S) vectors, a value at each position is 0, and a length of each of the (N−S) vectors is M. At last, N vectors are obtained, and each of the N vectors has a length of M. That is, a vector sequence of the license plate characters is vectors of N×M, which is an encoding sequence corresponding to the license plate number. The encoded vector sequence of the license plate characters is similar to a text sequence, which can be directly sent to the Transformer model, as shown in FIG. 4.

For example, in an embodiment, a maximum length N of characters in a license plate is 4, and the number of character types M is 3 (taking letters "A", "B" and "C" as examples), for a license plate number "BAA", three vectors, each of which has a length of 3, are generated to represent the characters "B", "A" and "A" respectively. A vector corresponding to the character "B" is [0, 1, 0], and a vector corresponding to the character "A" is [1, 0, 0]. As the length of the characters of the present license plate is 1 less than the maximum length of characters, an empty vector [0, 0, 0] needs to be supplemented. The final encoded vector sequence of the license plate characters corresponding to the license plate "BAA" is {[0, 1, 0]; [1, 0, 0]; [1, 0, 0]; [0, 0, 0]}.

In an operation 24, the vector sequence of the characters in the license plate is processed through the Transformer model to obtain the first license plate feature.

Figure 5:
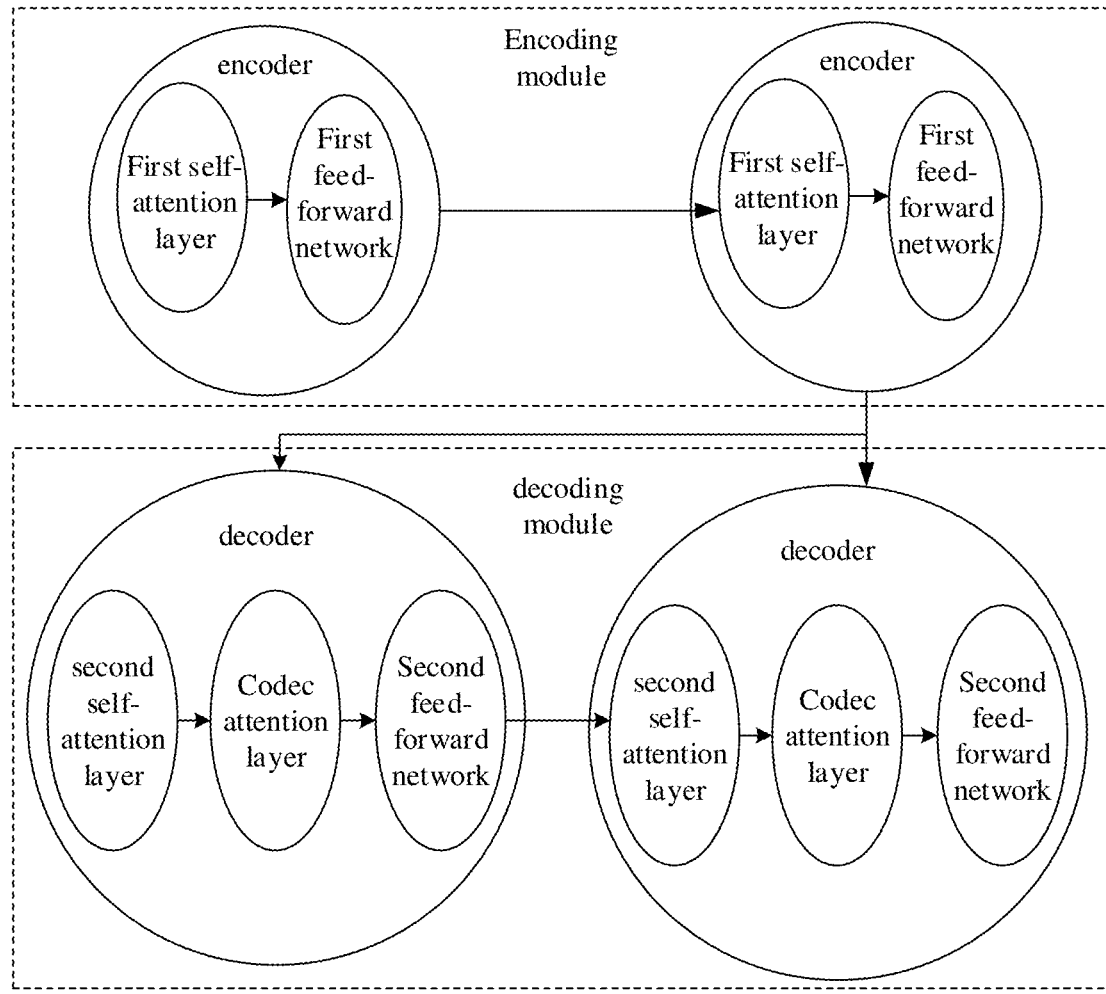
FIG. 5 is a structural schematic view of a Transformer model according to an embodiment of the present disclosure.

The Transformer model includes an encoding module and a decoding module. As shown in FIG. 5, the vector sequence of the characters in the license plate is encoded by the encoding module to obtain an encoded vector of the characters of the license plate. The encoded vector of the characters of the license plate is decoded by the decoding module to obtain the first license plate feature.

Further, the encoding module includes a plurality of encoders connected in series, and the decoding module includes the corresponding number of decoders, i.e., the number of encoders is the same as the number of decoders. In an example shown in FIG. 5, the number of encoders and the number of decoders are 2. Each of the encoders has a same structure. Each encoder includes a first self-attention layer and a first feedforward network. The input vector passes through the first self-attention layer. Data output from the first self-attention layer is transferred to the first feedforward neural network and subsequently enters a next encoder. An output of a last encoder is sent to each decoder and, in the decoder, transfers through a second self-attention layer, a second codec-attention layer and a second feedforward neural network successively. A final output vector is the feature vector containing the rules of the characters in the license plate.

In an operation 25, the feature extraction process is performed on the first license plate image to obtain a second license plate feature.

As shown in FIG. 4, the first license plate image is processed by the CNN network to extract features in the first license plate image, generating the second license plate feature. In detail, in a branch where the CNN network is located (i.e., CNN network branch), any advanced backbone network may be applied to extract the appearance feature of the first license plate image. In the CNN network branch, a feature map of the license plate is obtained at an end of the network. In order to fuse with the feature vector output from the Transformer model, the appearance feature and the feature map both need to be adjusted in dimensions by a shaping network, as shown in operations 26-27.

In an operation 26, dimensionality of the first license plate feature is reduced by a first shaping network to obtain a first license plate feature that has reduced dimensionality.

As shown in FIG. 4, the classification network includes the first shaping network connected to the Transformer model. The first shaping network receives the first license plate feature output by the Transformer model, performs dimensionality reduction on the first license plate feature, and inputs the processed feature into a feature fusion layer.

In an operation 27, dimensionality of the second license plate feature is reduced by a second shaping network to obtain a second license plate feature that has reduced dimensionality.

As shown in FIG. 4, the classification network further includes the second shaping network connected to the CNN network. The second shaping network receives the second license plate feature output by the CNN network and performs dimensionality reduction on the second license plate feature, such that the dimensionality of the first license plate feature, which has the reduced dimensionality, is equal to the dimensionality of the second license plate feature, which has the reduced dimensionality. The second shaping network inputs the second license plate feature that is reduced dimensional into the feature fusion layer, i.e., dimensionalities of features from the two branches input to the feature fusion layer is equal.

It should be understood that, only one of the first shaping network and the second shaping network may be configured. When the dimensionality of the first license plate feature is greater than the dimensionality of the second license plate feature, only the first shaping network is configured. The first shaping network is applied to reduce the dimensionality of the first license plate feature to be equal to the dimensionality of the second license plate feature. When the dimensionality of the first license plate feature is less than the dimensionality of the second license plate feature, only the second shaping network is configured. The second shaping network is applied to reduce the dimensionality of the second license plate feature to be equal to the dimensionality of the first license plate feature.

In an operation 28, the feature fusion layer is applied to fuse the first license plate feature with the second license plate feature to obtain a fused license plate feature.

As shown in FIG. 4, the classification network further includes the feature fusion layer. The feature fusion layer receives the features output by the first shaping network and the second shaping network and fuses the features to generate a new feature (i.e., the fused license plate feature). For example, a dimensionality of the feature output by the first shaping network is 1*512, and a dimensionality of the feature output by the second shaping network is 1*512. A dimensionality of the fused license plate feature is 1*512.

In an operation 29, a classification process is performed on the fused license plate feature through a classification layer to obtain the first license plate classification result.

As shown in FIG. 4, the classification layer receives the fused license plate feature output by the feature fusion layer, classifies the fused license plate feature, and generates a corresponding classification result, and thereby determines a nation to which a current license plate to be classified belongs. In detail, the classification layer may include fully connected layers.

Figure 1B:
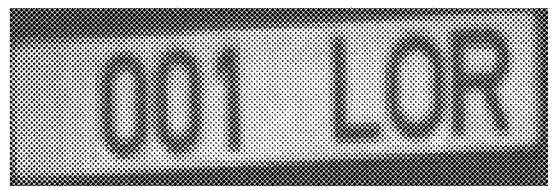
Figure 1C:
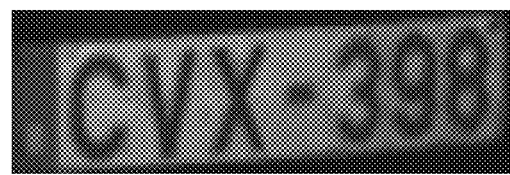
Figure 6:
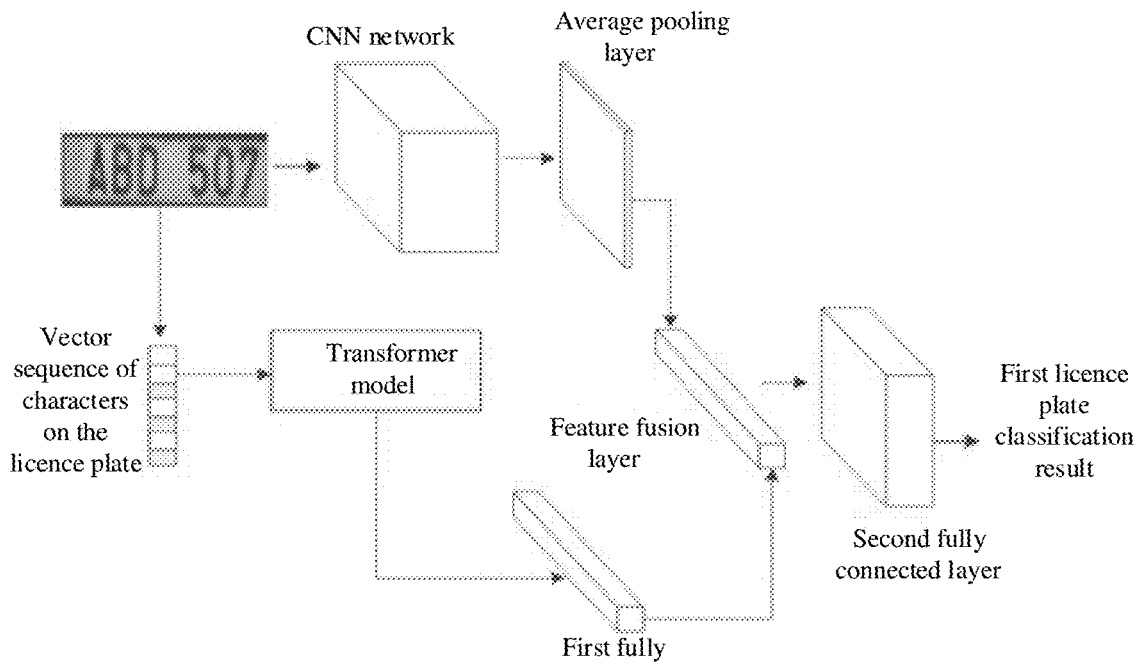
FIG. 6 is a structural schematic view of license plate classification according to another embodiment of the present disclosure.

In an embodiment, as shown in FIG. 6, the first license plate image is the image shown in FIG. 1(a), the first shaping network is a first fully connected layer, the second shaping network is an average pooling layer, and the classification layer is a second fully connected layer.

Average pooling is performed on the feature map output from the CNN network, and dimensionality of the feature map is reduced to be 1*512. The feature vector output from the Transformer model is transformed to a fixed size of 1*512 by the first fully connected layer. The feature map having the reduced dimensionality and the feature vector having the fixed size are fused and summed by the feature fusion layer to obtain a new feature vector. The new feature vector is sent to the second fully connected layer. At last, the nation, which the license plate belongs to, is output.

In the present embodiment, the classification network is a multi-input network that classifies the oversea license plates by nations and fuses the CNN features and the Transformer features. The network may learn both the appearance of license plate and the inner format of license plate, encode the character content of license plate into input acceptable to the Transformer through one-hot encoding, extract the inner rule of license plate characters through the Transformer, and transform the license plate characters into the useful feature for classification by nations. In this way, the accuracy of classifying the license plates by nations is improved.

It should be understood that, before applying the classification network, the classification network needs to be trained to ensure the accuracy of classification. The classification network may be trained by performing following operations.

a. Classification training data is obtained.

a1) A classification training image is obtained.

A second license plate image is captured by the camera. The second license plate image is an image including the license plate.

a2) The license plate recognition process is performed on the classification training image to obtain the second license plate recognition result.

After obtaining the classification training image, the classification training image may be recognized by the license plate recognition network to generate a corresponding license plate recognition result (recorded as the second license plate recognition result).

a3) The second license plate recognition result is encoded to obtain a third license plate feature.

The one-hot encoding process is performed to encode the second license plate recognition result to obtain the vector sequence of the license plate characters. The Transformer model is applied to process the vector sequence of the license plate characters to extract the text feature of the second license plate image. The text feature of the second license plate image is recorded as the third license plate feature.

a4) The feature extraction process is performed on the classification training image to obtain a fourth license plate feature.

The trained CNN network is applied to extract the feature in the classification training image to generate the fourth license plate feature. It should be understood that, when the classification training image includes other non-license plate content, a license plate detection algorithm is applied to obtain a location of the license plate. Subsequently, an image corresponding to the location of the license plate is cropped and serves as an input to the license plate recognition network and the CNN network. In this way, complexity of computation is reduced, and the accuracy of recognition is improved, and an efficiency of feature extraction is improved.

The operations a1-a4 in the above are performed repeatedly to obtain sufficient classification training data for classifying the plates by nations. The classification training data includes multiple sets of training features. Each of the multiple sets of training features includes the third license plate feature and the corresponding fourth license plate feature.

b. The classification network is trained by taking the classification training data.

b1) One set of training features is selected from the classification training data and serves as current training features.

One set of training features selected from the classification training data either randomly or based on a preset order serve as the current training features and are input to the classification network to train the entire classification network. The training features include the third license plate feature and the corresponding fourth license plate feature.

b2) The third license plate feature and the fourth license plate feature in the current training features are processed by the classification network to obtain the second license plate classification result.

After obtaining the third license plate feature and the fourth license plate feature, the two input features may be processed by the classification network to obtain a corresponding classification result. In detail, as shown in FIG. 4, the classification network includes the first shaping network, the second shaping network, the feature fusion layer and the classification layer. Detailed functions and roles have been described in the above-mentioned embodiments, and will not be repeated hereinafter.

b3) Classification accuracy of the classification network is determined as exceeding a preset threshold.

In order to determine when to terminate the training, the classification accuracy of the current classification network may be calculated, and a relationship between the classification accuracy and the preset threshold may be determined.

b4) When the classification accuracy of the classification network does not exceed the preset threshold, parameters of the classification network are adjusted based on the second license plate classification result.

When it is determined that the classification accuracy of the current classification network does not exceed the preset threshold, the current classification accuracy does not meet preset requirements, i.e., the training of the classification network is not terminated. In this case, the parameters of the classification network may be adjusted based on the second license plate classification result, and the operation of selecting one set of training features from the classification training data as the current training features is performed, i.e., the operation b1 is performed, until the classification accuracy of the classification network exceeds the preset threshold.

b5) When the classification accuracy of the classification network exceeds the preset threshold, the training is terminated, and the classification network is output.

When the classification accuracy of the current classification network is detected as exceeding the preset threshold, the classification accuracy of the current classification network is high and meets the preset requirements. In this case, the training may be terminated, and the trained classification network model may be output.

In the present embodiment, a new method of classifying license plates by nations based on deep learning is provided. The method considers pattern characteristics of the license plate of each nation. One-hot encoding is performed on the content of the license plate characters. Each character is encoded into a unique feature vector. The encoded vector is input into the Transformer branch, and the text feature is extracted directly. The original license plate image is sent into the CNN network, and the appearance feature is extracted. Through the average pooling layer and the fully connected layer, the outputs of the two branches are mapped to the same dimension and fused. The fused feature is classified by the classification layer including the fully connected layers to obtain the nation classification result. The Transformer branch can directly extract the text feature of the license plate characters to better find relationships between the license plate characters and the nation to which the license plate belongs. According to the present method, effective prior knowledge about the content of the license plates is provided for the classification network, and the difficulty of the CNN network learning the inner format feature of the license plate is reduced, such that the accuracy of classification is improved.

Figure 7:
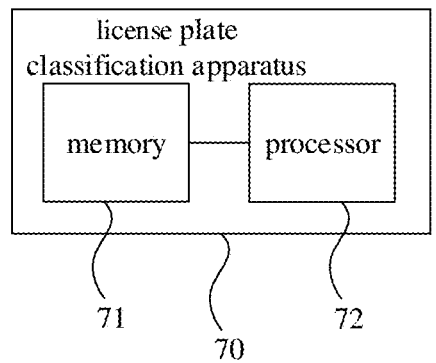
FIG. 7 is a structural schematic view of a license plate classification apparatus according to an embodiment of the present disclosure.

As shown in FIG. 7, FIG. 7 is a structural schematic view of a license plate classification apparatus according to an embodiment of the present disclosure. The license plate classification apparatus 70 includes a memory 71 and a processor 72 connected to the memory 71. The memory 71 is configured to store a computer program. The computer program is configured to implement the license plate classification method in the above embodiment when being executed by the processor 72.

The present embodiment provides a method of classifying oversea license plates by nations based on CNN and Transformer feature fusion. The features of CNN and Transformer are fused. The license plate characters are encoded by the one-hot encoding process. Each character is represented by a unique vector. The Transformer model is applied to extract the text feature directly. With the help of powerful properties of the Transformer model, inner connection between the license plate characters is provided for the network directly, effectively and meticulously, assisting in classification by nations. That is, the text feature of the license plate format is fused with the appearance feature of the license plate extracted by the CNN. In this way, the classification network may learn the inner format of the license plate and may be effectively applied in performing the task of classifying oversea license plates by nations.

Figure 8:
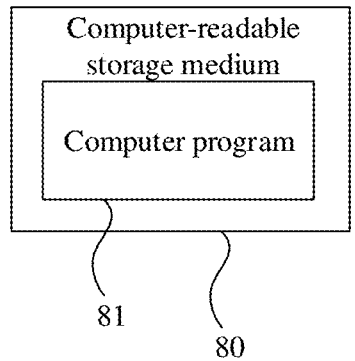
FIG. 8 is a structural schematic view of a computer-readable non-transitory storage medium according to an embodiment of the present disclosure.

As shown in FIG. 8, FIG. 8 is a structural schematic view of a computer-readable non-transitory storage medium according to an embodiment of the present disclosure. The computer-readable non-transitory storage medium 80 is configured to store a computer program 81. The computer program 81 is configured to implement the license plate classification method in the above embodiment when being executed.

The computer readable non-transitory storage medium 80 may be a server, a universal serial bus disk, a mobile hard drive, a read-only memory (ROM, Read-Only Memory), a random access memory (RAM, Random Access Memory), a magnetic disk or an optical disk and various media that can store program codes.

In the several embodiments provided in the present disclosure, it should be understood that the disclosed methods and the apparatus can be implemented by other means. For example, the apparatus in the above described embodiments is merely exemplary. For example, modules or units are divided based on logical functions only but can be divided in another way practically. For example, multiple units or components can be combined or integrated into another system, or some features can be omitted or not implemented.

The units illustrated as separated components may or may not be physically separated. A component displayed as a unit may or may not be a physical unit. That is, the component may be located in one place or distributed to multiple network units. A part of or the entire unit can be selected according to practical needs to achieve the purpose of the present disclosure.

In addition, each functional unit in each implementation of the present disclosure can be integrated in one single processing unit or physically present separately. Alternatively, two or more units can be integrated in one single unit. The above integrated unit can be implemented either in a form of hardware or in a form of software functional units.

The above shows only an example of the present disclosure, but does not limit the scope of the present disclosure. Any equivalent structure or equivalent process transformation based on the specification and the accompanying drawings of the present disclosure, directly or indirectly applied in other related fields, shall be included in the scope of the present disclosure.

What is claimed is:

1. A license plate classification method, comprising:
   performing a license plate recognition process on a first license plate image to obtain a license plate recognition result;
   performing an encoding process on the license plate recognition result to obtain a first license plate feature;
   performing a feature extraction process on the first license plate image to obtain a second license plate feature; and
   processing the first license plate feature and the second license plate feature through a classification network to obtain a first license plate classification result.

2. The license plate classification method according to claim 1, wherein the performing an encoding process on the license plate recognition result to obtain a first license plate feature, comprises:
   encoding the license plate recognition result by applying a preset encoding mode to obtain a vector sequence of a character of the license plate; and
   processing the vector sequence of the character of the license plate by applying the Transformer model to obtain the first license plate feature.

3. The license plate classification method according to claim 2, wherein the preset encoding mode is one-hot encoding, the vector sequence of the character of the license plate is a vector of N×M, wherein the N is a maximum length of characters of the license plate, and the M is a type of the character of the license plate.

4. The license plate classification method according to claim 2, wherein the Transformer model comprises an encoding module and a decoding module, and the processing the vector sequence of the character of the license plate by applying the Transformer model to obtain the first license plate feature, comprises:
   encoding the vector sequence of the character of the license plate through the encoding module to obtain an encoded vector of the character of the license plate; and
   decoding the encoded vector of the character of the license plate through the decoding module to obtain the first license plate feature.

5. The license plate classification method according to claim 1, wherein the classification network comprises a feature fusion layer and a classification layer, and the processing the first license plate feature and the second license plate feature through a classification network to obtain a first license plate classification result, comprises:
   fusing the first license plate feature with the second license plate feature through the feature fusion layer to obtain a fused license plate feature; and
   classifying the fused license plate feature through the classification layer to obtain the first license plate classification result.

6. The license plate classification method according to claim 5, wherein the classification network further comprises a first shaping network and a second shaping network, the fusing the first license plate feature with the second license plate feature through the feature fusion layer to obtain a fused license plate feature, comprises:
   performing a dimensionality reduction process on the first license plate feature through the first shaping network to obtain a first license plate feature that has reduced dimensionality; and
   performing a dimensionality reduction process on the second license plate feature through the second shaping network to obtain a second license plate feature that has reduced dimensionality;
   wherein dimensionality of the first license plate feature that has reduced dimensionality is equal to dimensionality of the second license plate feature that has reduced dimensionality.

7. The license plate classification method according to claim 1, before the performing a license plate recognition process on a first license plate image to obtain a license plate recognition result, further comprising:
   acquiring an image to be processed; and
   cropping the image to be processed to generate the first license plate image;
   wherein the first license plate image comprises a license plate.

8. The license plate classification method according to claim 7, wherein the cropping the image to be processed to generate the first license plate image, comprises:
   obtaining, by a license plate detection model, a location in the image to be processed where the license plate is located; and
   cropping an image of the location in the image to be processed where the license plate is located to obtain the first license plate image.

9. The license plate classification method according to claim 1, wherein the performing a license plate recognition process on a first license plate image to obtain a license plate recognition result, comprises:
   recognizing a character in the first license plate image through a license plate recognition network to obtain the license plate recognition result.

10. The license plate classification method according to claim 1, before the performing a license plate recognition process on a first license plate image to obtain a license plate recognition result, further comprising:
    obtaining a classification training image;
    performing the license plate recognition process on the classification training image to obtain a second license plate recognition result;
    performing the encoding process on the second license plate recognition result to obtain a third license plate feature;
    performing the feature extraction process on the classification training image to obtain a fourth license plate feature;
    repeating the above operations to obtain classification training data, wherein the classification training data comprises a plurality of sets of training features, the training features comprise the third license plate feature and a corresponding fourth license plate feature;
    selecting one set from the plurality of sets of training features as current training features;
    processing the third license plate feature and the fourth license plate feature of the current training features through the classification network to obtain a second license plate classification result;

adjusting a parameter of the classification network based on the second license plate classification result; and returning to the operation of selecting one set from the plurality of sets of training features as current training features until classification accuracy of the classification network exceeds a preset threshold.

11. A license plate classification apparatus, comprising a non-transitory memory and a processor connected to the non-transitory memory, wherein the non-transitory memory is configured to store a computer program, and when the computer program is executed, the computer program is configured to perform operations of:

performing a license plate recognition process on a first license plate image to obtain a license plate recognition result;

performing an encoding process on the license plate recognition result to obtain a first license plate feature;

performing a feature extraction process on the first license plate image to obtain a second license plate feature; and processing the first license plate feature and the second license plate feature through a classification network to obtain a first license plate classification result.

12. The license plate classification apparatus according to claim 11, wherein, while performing the encoding process on the license plate recognition result to obtain the first license plate feature, the computer program is configured to perform operations of:

encoding the license plate recognition result by applying a preset encoding mode to obtain a vector sequence of a character of the license plate; and processing the vector sequence of the character of the license plate by applying the Transformer model to obtain the first license plate feature.

13. The license plate classification apparatus according to claim 12, wherein the preset encoding mode is one-hot encoding, the vector sequence of the character of the license plate is a vector of N×M, wherein the N is a maximum length of characters of the license plate, and the M is a type of the character of the license plate.

14. The license plate classification apparatus according to claim 12, wherein the Transformer model comprises an encoding module and a decoding module, and while processing the vector sequence of the character of the license plate by applying the Transformer model to obtain the first license plate feature, the computer program is configured to perform operations of:

encoding the vector sequence of the character of the license plate through the encoding module to obtain an encoded vector of the character of the license plate; and decoding the encoded vector of the character of the license plate through the decoding module to obtain the first license plate feature.

15. The license plate classification apparatus according to claim 11, wherein the classification network comprises a feature fusion layer and a classification layer, and while processing the first license plate feature and the second license plate feature through the classification network to obtain the first license plate classification result, the computer program is configured to perform operations of:

fusing the first license plate feature with the second license plate feature through the feature fusion layer to obtain a fused license plate feature; and classifying the fused license plate feature through the classification layer to obtain the first license plate classification result.

16. The license plate classification apparatus according to claim 15, wherein the classification network further comprises a first shaping network and a second shaping network, and while fusing the first license plate feature with the second license plate feature through the feature fusion layer to obtain the fused license plate feature, the computer program is configured to perform operations of:

performing a dimensionality reduction process on the first license plate feature through the first shaping network to obtain a first license plate feature that has reduced dimensionality; and performing a dimensionality reduction process on the second license plate feature through the second shaping network to obtain a second license plate feature that has reduced dimensionality;

wherein dimensionality of the first license plate feature that has reduced dimensionality is equal to dimensionality of the second license plate feature that has reduced dimensionality.

17. The license plate classification apparatus according to claim 11, before performing the license plate recognition process on the first license plate image to obtain the license plate recognition result, the computer program is configured to perform operations of:

acquiring an image to be processed; and cropping the image to be processed to generate the first license plate image;

wherein the first license plate image comprises a license plate.

18. The license plate classification apparatus according to claim 17, wherein while cropping the image to be processed to generate the first license plate image, the computer program is configured to perform operations of:

obtaining, by a license plate detection model, a location in the image to be processed where the license plate is located; and cropping an image of the location in the image to be processed where the license plate is located to obtain the first license plate image.

19. The license plate classification apparatus according to claim 11, wherein before performing the license plate recognition process on the first license plate image to obtain the license plate recognition result, the computer program is configured to perform operations of:

obtaining a classification training image;

performing the license plate recognition process on the classification training image to obtain a second license plate recognition result;

performing the encoding process on the second license plate recognition result to obtain a third license plate feature;

performing the feature extraction process on the classification training image to obtain a fourth license plate feature;

repeating the above operations to obtain classification training data, wherein the classification training data comprises a plurality of sets of training features, the training features comprise the third license plate feature and a corresponding fourth license plate feature;

selecting one set from the plurality of sets of training features as current training features;

processing the third license plate feature and the fourth license plate feature of the current training features through the classification network to obtain a second license plate classification result;

adjusting a parameter of the classification network based on the second license plate classification result; and returning to the operation of selecting one set from the plurality of sets of training features as current training features until classification accuracy of the classification network exceeds a preset threshold.

20. A computer-readable non-transitory storage medium, configured to store a computer program, wherein when the computer program is executed, the computer program is configured to perform the operations of:
- performing a license plate recognition process on a first license plate image to obtain a license plate recognition result;
- performing an encoding process on the license plate recognition result to obtain a first license plate feature;
- performing a feature extraction process on the first license plate image to obtain a second license plate feature; and
- processing the first license plate feature and the second license plate feature through a classification network to obtain a first license plate classification result.

* * * * *